(12) United States Patent
Danules et al.

(10) Patent No.: US 7,105,113 B2
(45) Date of Patent: Sep. 12, 2006

(54) METHOD FOR FLATPROOFING A TIRE AND WHEEL ASSEMBLY AND RESULTING FLATPROOFED ASSEMBLY

(75) Inventors: John Danules, Fenton, MI (US); Steve Anderson, Edina, MI (US); Van Doesburg, Dalton, GA (US)

(73) Assignee: Urethane International LLC, Alpharetta, GA (US)

( * ) Notice: Subject to any disclaimer, the term of this patent is extended or adjusted under 35 U.S.C. 154(b) by 298 days.

(21) Appl. No.: 10/687,537

(22) Filed: Oct. 16, 2003

(65) Prior Publication Data

US 2005/0006013 A1     Jan. 13, 2005

Related U.S. Application Data

(60) Provisional application No. 60/486,666, filed on Jul. 11, 2003.

(51) Int. Cl.
B29C 44/06 (2006.01)

(52) U.S. Cl. .......... 264/46.6; 264/46.9; 264/50

(58) Field of Classification Search ............ 264/46.6, 264/46.9, 50
See application file for complete search history.

(56) References Cited

U.S. PATENT DOCUMENTS

| | | | |
|---|---|---|---|
| 3,022,810 A * | 2/1962 | Lambe | 152/157 |
| 3,409,044 A | 11/1968 | Sobek et al. | |
| 3,675,705 A | 7/1972 | Corless | |
| 3,808,660 A | 5/1974 | Wik | |
| 3,827,792 A | 8/1974 | Hollins | |
| 3,872,201 A | 3/1975 | Paul et al. | |
| 3,882,052 A * | 5/1975 | Raynor et al. | 521/129 |
| 3,940,517 A | 2/1976 | DeLeon | |
| 4,060,578 A | 11/1977 | Kisbany | |
| 4,115,172 A | 9/1978 | Baboff et al. | |
| 4,116,895 A | 9/1978 | Kageyama et al. | |
| 4,123,007 A | 10/1978 | Gardner | |
| 4,144,295 A | 3/1979 | Dever, Jr. | |
| 4,175,702 A | 11/1979 | Hetherington et al. | |
| 4,204,977 A | 5/1980 | Zwirlein | |
| 4,248,811 A | 2/1981 | Doyle et al. | |
| 4,262,847 A | 4/1981 | Stitzer et al. | |
| 4,272,301 A | 6/1981 | Galbraith et al. | |
| 4,273,822 A | 6/1981 | Bube | |
| 4,289,089 A | 9/1981 | Tacke et al. | |
| 4,366,919 A | 1/1983 | Anderson | |
| 4,440,208 A * | 4/1984 | Trickel et al. | 152/314 |
| 4,522,504 A | 6/1985 | Greverath | |
| 4,683,929 A * | 8/1987 | Wyman | 152/313 |
| 4,708,292 A | 11/1987 | Gammons | |
| 4,734,232 A | 3/1988 | Hoesman | |
| 4,783,295 A * | 11/1988 | Kearns et al. | 264/50 |
| 4,801,008 A | 1/1989 | Rich | |
| 4,958,587 A | 9/1990 | Fogal et al. | |
| 5,033,650 A | 7/1991 | Colin et al. | |

(Continued)

Primary Examiner—Allan R. Kuhns
(74) Attorney, Agent, or Firm—Todd Deveau; Thomas, Kayden, Horstemeyer & Risley LLP

(57) ABSTRACT

A method is disclosed for flatproofing a tire and wheel assembly with a flexible, lightweight foam-fill by supplying at least two polyurethane reactive materials to a static mixer. The static mixer mixes the reactants, and a nucleating gas is supplied to the mixed reactants in the static mixer to form a liquid reactant mixture with entrained gas. The reactant mixture is injected into the tire and wheel assembly where the mixture reacts and foams replacing the air in the tire with a flexible, lightweight semi-open cell foam-fill. The resulting foam-filled tire and wheel assembly is then allowed to cure.

21 Claims, 5 Drawing Sheets

U.S. PATENT DOCUMENTS

| | | | |
|---|---|---|---|
| 5,053,202 A | 10/1991 | Dwyer et al. | |
| 5,184,757 A | 2/1993 | Colin et al. | |
| 5,390,031 A | 2/1995 | Kang et al. | |
| 5,397,180 A | 3/1995 | Miller | |
| 5,472,031 A | 12/1995 | Austin | |
| 5,566,860 A | 10/1996 | Schiltz | |
| 5,893,486 A | 4/1999 | Wasmire | |
| 5,962,779 A | 10/1999 | Bass | |
| 6,187,125 B1 * | 2/2001 | Rustad et al. | 156/112 |
| 6,293,762 B1 | 9/2001 | Farkhan | |
| 6,345,650 B1 | 2/2002 | Paasch et al. | |
| 6,454,892 B1 | 9/2002 | Gerresheim et al. | |
| 6,668,875 B1 | 12/2003 | Kojima et al. | |
| 6,733,707 B1 * | 5/2004 | Serman et al. | 264/51 |
| 6,889,723 B1 | 5/2005 | Gerresheim et al. | |
| 2002/0020351 A1 | 2/2002 | Shaffer | |
| 2002/0020478 A1 | 2/2002 | Shaffer | |
| 2002/0020479 A1 | 2/2002 | Shaffer | |
| 2004/0149364 A1 | 8/2004 | Shaffer | |
| 2004/0149371 A1 | 8/2004 | Shaffer | |
| 2004/0149391 A1 | 8/2004 | Shaffer | |

\* cited by examiner

METHOD FOR FLATPROOFING A TIRE AND WHEEL ASSEMBLY AND RESULTING FLATPROOFED ASSEMBLY

RELATED APPLICATION

This application claims priority to and the benefit of provisional application, Ser. No. 60/486,666 filed Jul. 11, 2003.

TECHNICAL FIELD

The present invention is generally related to flatproofing tire and wheel assemblies, and, more particularly, to flatproofing tubeless tire and wheel assemblies using lightweight flexible polyurethane foam formed in the tubeless tire/wheel assemblies to replace air in the tubeless tire/wheel assemblies and to the resulting flatproofed assembly.

BACKGROUND OF THE INVENTION

Traditionally, flatproof tires have been made by one of the following methods. In one method, a solid polyurethane material is injected into a solid mold for producing a flatproof tire. The mold with the solid polyurethane material is heated and rotated, and then allowed to cure. After curing the solid polyurethane tire is removed from the mold.

Another flatproofing method offered by several companies including, Arnco, CinAir and Carpenter, is generally known as "traditional fill" and involves filling a rubber tire mounted on a wheel with solid polyurethane. Polyurethane reactants (a polyol and an isocyanate) are mixed using a static mixer and pumped into the tire through the valve stem in the wheel under the same pressure as the normal air inflation pressure for the tire. The reactant mixture is then allowed to cure inside the tire forming a solid polyurethane fill within the tire. Typically, an extender, such as an oil, is included in the reactant mixture. Solid polyurethane, however, is very heavy. For example, a typical solid polyurethane fill with an oil extender has no cells and has a high density of about 62.4 lbs/ft$^3$ making it practical for use only with heavy equipment. This method has additional drawbacks. Because the reactants are pumped into the tire under pressure, namely the normal inflation pressure of the tire, the tire must be filled while placed within a safety cage in case the tire fails during filling.

Other flatproofing methods use non-urethane flatproofing materials that do not replace the air in the tire and wheel assembly. They seal leaks and/or punctures in the tire to minimize the loss of air. In this regard, these non-urethane flatproofing materials are not considered flatproof.

From the above, it can be appreciated that it would be desirable to have a flexible, lightweight polyurethane foam that replaces the inflating air in the tire as a means to support the tubeless rubber tire allowing it to be used in low speed applications and applications other than for heavy equipment. Examples of such desired low speed, light weight applications include, off-road, construction and turf and garden applications. Such flexible foam would provide the pneumatic performance of an air inflated pneumatic tire due to its flexible cell walls, semi-open cell structure, and density, size and uniform distribution of the cells. It can also be appreciated that it would be desirable to have a process for flatproofing a tire and wheel assembly by injecting liquid reactant materials into the tire and wheel assembly to form a flexible polyurethane foam that replaces the inflating air in the tubeless tire and wheel assembly that is relatively maintenance free. Further, it can be appreciated that it would be desirable to have a portable apparatus that injects the liquid reactant materials into a tubeless tire and wheel assembly for flatproofing, and can be used in the field by the tire dealers, avoiding the need to return the tire to a factory. Further it can be appreciated that it would be desirable for safety considerations to have a fill process that does not require the tire cavity to be pressurized.

SUMMARY OF THE INVENTION

A method is disclosed for flatproofing a tire and wheel assembly by forming a flexible foam, namely a lightweight, flexible polyurethane foam, in situ, in a tire and wheel assembly. The lightweight, flexible polyurethane foam replaces the inflating air as the means to inflate and support the tire used in low speed applications. The flexible polyurethane foam provides a pneumatic performance similar to inflating air due to its flexible cell walls, cellular structure, and low density, size and uniform distribution of the cells. Based on the combination of the lightweight flexible polyurethane foam and the foam-filled dispensing apparatus of the present invention, tire factories and/or dealers in the field may obtain a portable apparatus for injecting liquid reactant materials into the tire and wheel assembly. In an exemplary embodiment, the flexible polyurethane foam reactants of the present invention can be stored and processed at ambient temperature (meaning about 70 degrees Fahrenheit+about 10 degrees).

Moreover, the reactants are not required to be injected into the tire at the normal air inflation pressure of the tire. They do not need to be pumped into the tire under pressure as the foaming action of the reactant material forces the air out of the tire cavity and fills the entire cavity. Thus, the reactants can be pumped into the tire at effectively ambient pressure.

The flexible polyurethane is a polymerization product of a polyol component, an isocyanate component, water (optional) and a catalyst system that promotes a polymerization reaction between the isocyanate component and the polyol component to form the polyurethane. Normal practice in the art is to form an isocyanate mixture, referred to as SIDE A; and to form a mixture of polyols, chain extenders, cross linking agents, fillers, blowing agents, surfactants, catalysts etc., commonly referred to as SIDE B. The SIDE A component and the SIDE B component are mixed together at a given ratio to form the desired polyurethane polymer.

The polyol component can contain either a single polyol or a mixture of two or more polyols. The specific polyols useful in the manufacture of polyurethane foams are well known in the art and include aliphatic, alicyclic and aromatic polyols. The isocyanate component can contain either a single isocyanate or a mixture of two or more isocyanates. The specific isocyanates useful in the manufacture of polyurethane polymers are well-known in the art and include aliphatic, alicyclic and aromatic isocyanates. Suitable isocyanates have an average functionality within the range of 2–8, preferably within the range of 2–5. Examples of suitable isocyanates are 2,4-toluene diisocyanate; 2,6-toluene diisocyanate; 1,6-hexamethylene diisocyanate; naphthalene-1,4-diisocyanate; diphenyl methane 4,4'-diisocyanate; 4,4'-diphenylene diisocyanate; 3,3'-dimethoxy biphenylene diisocyanate; polymeric forms of the above diisocyanates, diisocyanato carbodiimide modified MDI, isocyanate terminated prepolymers, and mixtures of the above listed isocyanates. The preferred reactant materials are obtained from Textile Rubber Company and are identified as EX303-41A and EZ303-41B.

In an exemplary embodiment, the method includes mounting a tire, such as a pneumatic tire, on a wheel. The tire is then inflated with air or other gas to its maximum rated inflation pressure to stretch the tire out. After the tire has had sufficient time to stretch, vent holes are formed in the tire and the valve stem removed. Reactant materials to produce a foam are mixed in liquid form, and a nucleating gas, such as air, is introduced into the liquid reactant mixture to entrain the gas within the reactant mixture. This reactant mixture can be formed under ambient conditions. The liquid reactant mixture with entrained gas is then introduced into the tire through the valve stem opening of the wheel. Once the tire is filled with the specified amount of liquid reactant mixture, a plug is inserted into the valve stem opening. The reactant mixture is then allowed to react or foam within the tire. The foaming action produces a cellular foam structure of flow density, meaning a density of approximately 20 lbs./ft$^3$ or less. The vent holes in the tire allow air or other gas to escape from the tire as the reactant mixture is pumped into the tire, foams and pushes out the air that was previously in the tire. The foam is then allowed to cure. The curing time can be as much as 12 to 24 hours.

An exemplary apparatus is provided to carry out the above-described method for flatproofing a tire with a cellular foam structure. The apparatus includes a reactant mixing head and at least two supply lines for supplying individual reactant components to the mixing head. A mixer is attached to the mix head. A supply line is also provided to the mixer for supplying nucleating gas to the mixer. The mixer has an outlet nozzle for delivering the liquid reactant mixture with entrained gas into the tire through the valve stem opening of the wheel. In an exemplary form, the mixing head is what is referred to as a static mixer, and the reactant materials are mixed and pumped into the tire under ambient conditions. The mixer and supply lines can be associated with a portable cart having a work surface on which a tire and wheel assembly may be placed for filling with the liquid reactant mixture. The cart can optionally include motive means, such as pumps or compressed gas sources for delivering the reactant materials and/or the nucleating gas to the mixing head. If desired, a weight scale may be included in the work surface for monitoring the weight of the tire and wheel assembly during filling with the liquid reactant mixture.

Other methods, features and advantages of the disclosed method and resulting flatproofed tire and wheel assembly will be or become apparent to one with skill in the art upon examination of the following drawings and detailed description. It is intended that all additional methods, features, and advantages be included within this description, be within the scope of the present invention, and be protected by the accompanying claims.

BRIEF DESCRIPTION OF THE DRAWINGS

Many aspects of the disclosed method and resulting flatproofed tire and wheel assembly can be better understood with reference to the attached drawings, FIGS. 1–4. The components in the drawings are not necessarily to scale, emphasis instead being placed upon clearly illustrating the principles of the present invention. Moreover, in the drawings, like reference numerals do not need corresponding parts throughout the several views.

DETAILED DESCRIPTION OF THE PREFERRED EMBODIMENT

Figure 1A:
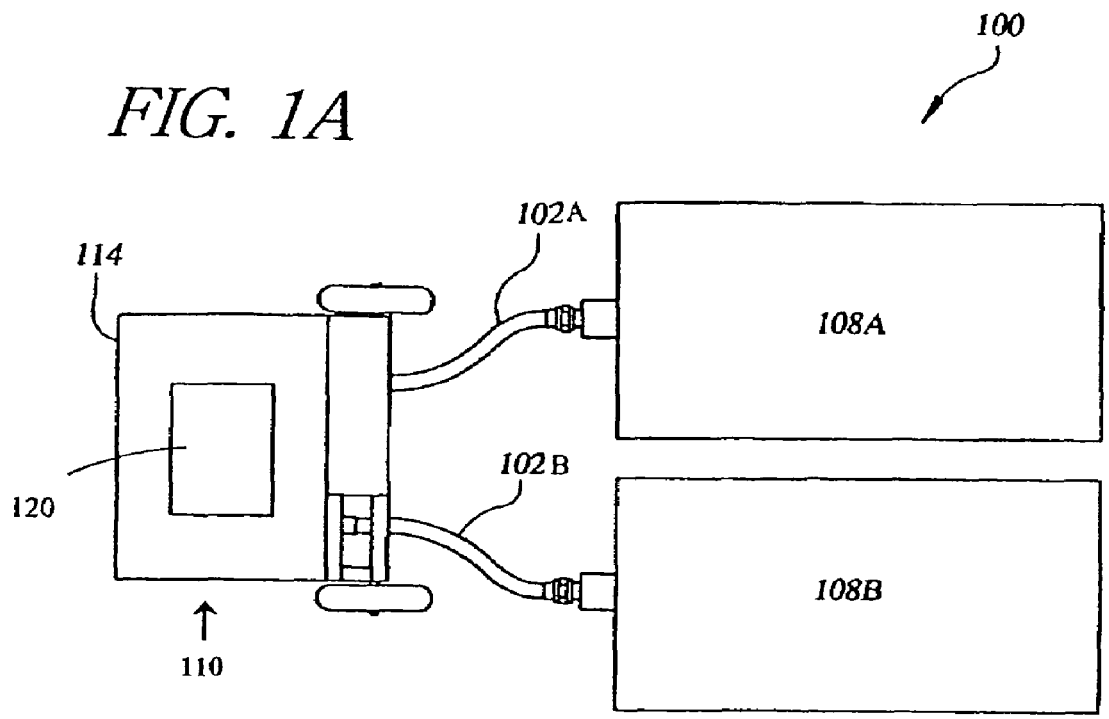
FIGS. 1A and B are schematic views of an embodiment of a foam-filled dispensing apparatus, a top view being illustrated in FIG. 1A and a side elevational view being illustrated in FIG. 1B.
Figure 1B:
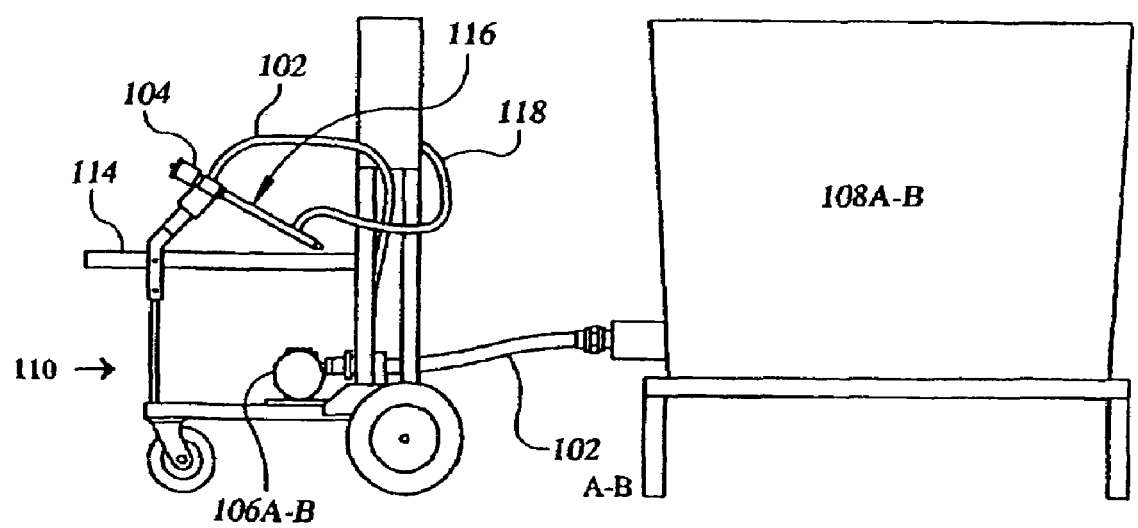
Figure 2:
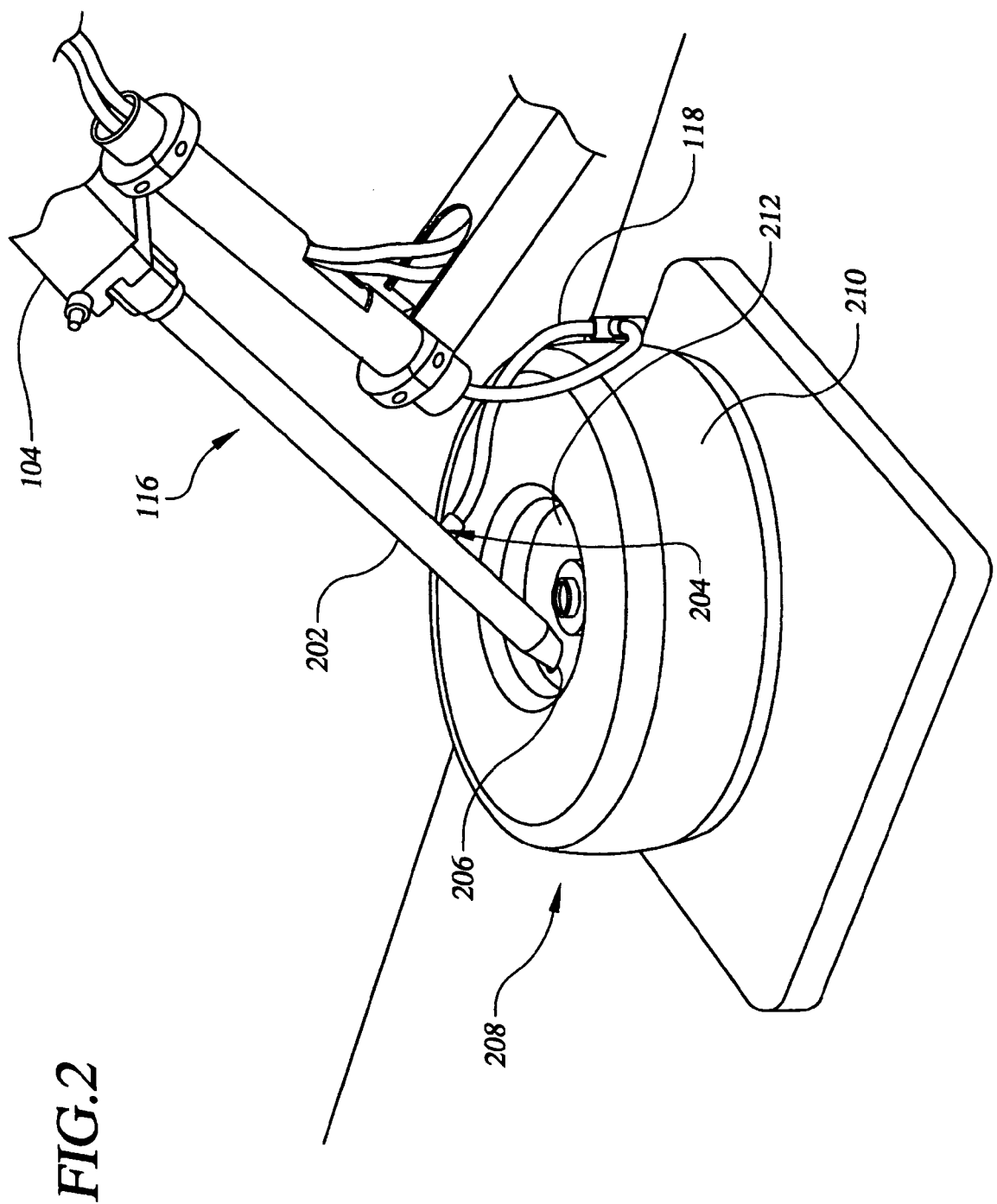
FIG. 2 is a perspective view of an embodiment of the static mixer and the tire and wheel assembly.
Figure 3:
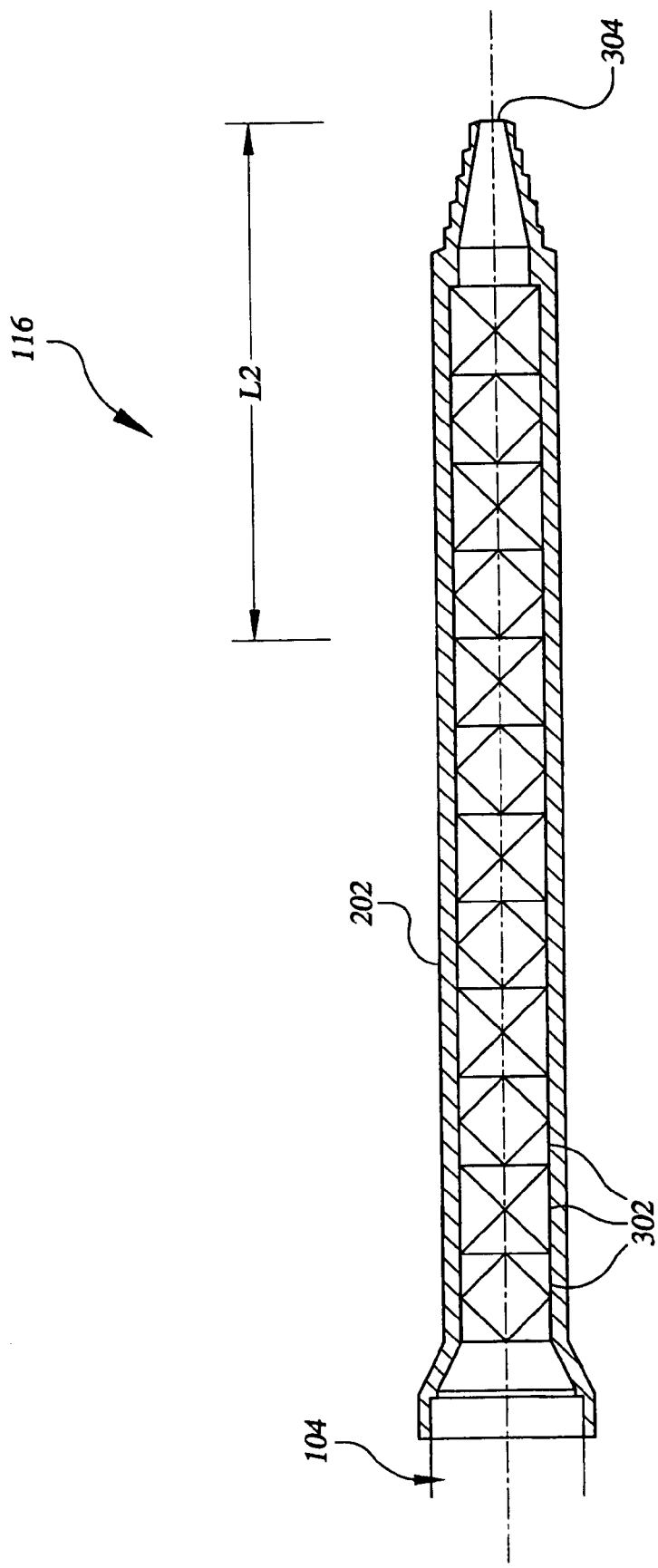
FIG. 3 is schematic view of an embodiment of a static mixer.

Referring now to the drawing figures, wherein like reference numerals represent like parts throughout the several views, an exemplary embodiment of an apparatus for producing foam-filled flatproofed tire and wheel assembly of the present invention is illustrated in FIGS. 1–3. Referring to FIGS. 1A and B, the foam-fill dispensing apparatus 100 comprises supply lines 102A–B for supplying reactant materials for creating the foam-fill, respective pumps 106A–B for delivering the reactant materials, a nucleating compressor (not shown), static mixer 116 which receives the polyurethane reactant materials delivered by pumps 106A–B, and optionally a work table 114. The apparatus 100 is coupled to the reactant material containers 108A–B. The reactant materials stored in containers 108A–B are used to make the flexible, lightweight foam for the tire and wheel assembly 208 (shown in FIG. 2) that replaces the inflating air in the tire and wheel assembly 208. The reactant materials are supplied to the mixer head 104 coupled to the static mixer 116 via the pumps 106A–B. The reactant materials travel through supply lines 102 to static mixer 116. The pumps 106A–B can be mechanically coupled to supply the desired amount and ratio of materials needed to flatproof the tire and wheel assembly 208 from containers 108A–B to the static mixer 116. The pumps 106A–B can be controlled by a control panel (not shown). The static mixer 116 is described in more detail with reference to FIG. 3. These components can be mounted to a wheeled cart assembly 110 to allow the apparatus to be portable.

A nucleating gas compressor (not shown) is coupled to a nucleating gas supply line 118, which is coupled to the static mixer 116. The nucleating gas compressor supplies nucleating gas through the nucleating material supply line 118 to the mixed reactant materials in the static mixer 116. The preferred source for nucleating gas is one that provides a dry, clean gas. One way to keep the gas dry and clean is to use an oil free compressor for the gas. Such a compressor can be mounted on the cart assembly 110 or located off the cart assembly. The source of the gas can be either an air tank or a commercial source.

In an exemplary embodiment, the tire and wheel assembly is filled with a low density flexible polyurethane foam. The reactant materials for creating the foam are a polyisocyanate and a polyol. The nucleating gas can be air. However, any other gas which would be inert with the reactant materials and the resultant foam can be used.

FIG. 3 is schematic view of an exemplary embodiment of a static mixer that can be used in the present invention. Referring to FIG. 3, the static mixer 116 includes a nucleating material inlet 202 and one or more helical elements 302. Static mixers of this type are available from ConPro Tec, Inc. and Tah Industries, Inc. A suitable static mixer 116 may be the type shown in U.S. Pat. No. 4,522,504. The static mixer 116 can be mechanically coupled to a mixer head 104 (shown in FIGS. 1 and 2) in which the mixer head 104 can be a pneumatic operating valve with dual inlet/outlet ports allowing the reactant materials from containers 108A–B to come together in the mixer. The static mixer 116 contains the helical elements 302, which have reversing helixes that mix the materials from containers 108A–B as the materials move through the static mixer 116. The static mixer 116 has an outlet 304 to dispense the mixture of liquid reactants with entrained gas into the tire and wheel assembly 208 via valve stem opening 206 (shown in FIG. 2). In an exemplary embodiment, the static mixer 116 has twelve (12) to forty-eight (48) helical elements 302. The system can be designed to allow for interchangeable mix heads and mixers depending on the desired material flow rates.

Also referring to FIG. 3, an orifice 204 along the nucleating material inlet 202 of the static mixer 116 is located in the static mixer 116 between the mixer head 104 and the static mixer outlet 304. In an exemplary embodiment, the orifice 204 may be located at the nucleating material inlet point (L2), which may be 5 to 8 helical elements 302 from the mixer head 104 end of the static mixer 116 towards its outlet 304. Alternatively, two sections of mixer 116 can be placed in line with a break between the sections where the inlet 202 can be placed to introduce the nucleating gas. The location of the orifice 204 can provide nucleating gas at approximately 10 PSI or more than the pressure of the reactant materials in the static mixer 116 to force the nucleating gas into the mixed reactant materials from containers 108A–B in the static mixer 116. If the orifice 204 is too close to the outlet 304 of the static mixer 116, the nucleating gas only pushes the mixed reactant materials and is not entrained in the mixed reactant materials. The pressure of nucleating gas supplied to the static mixer 116 should be equal to or greater than the pressure inside the static mixer 116. The nucleating gas pressure should also be high enough to entrain the gas into the mixture of the liquid reactants, which is injected into the tire and wheel assembly 208. The nucleating gas pressure is also coupled to the flow rate of the reactant materials. The higher the reactant material flow rate, the higher the desired nucleating gas flow rate. This mixture is injected into the tire and wheel assembly where the mixture reacts to create a semi-open cell foam. When the injection of the mixture of liquid reactants into the tire and wheel assembly 208 is completed, the foam-filled tire and wheel assembly 208 is cured for approximately 12–24 hours.

FIG. 2 is a perspective view of an embodiment of the static mixer and the tire and wheel assembly. Referring to FIG. 2, a drill fixture 212 can be placed over the tire and wheel assembly 208 as the side wall of the assembly 208 is facing up and away from the worktable 114. The drill fixture 212 can include a hub opening that is used as a guide to center the fixture 212. At least one vent hole is drilled through the tire carcass to provide an outlet for the air within the tire carcass to escape as the tire 210 is filled with the flexible polyurethane foam. In an exemplary embodiment the vent hole(s) are located in the side wall of the tire 210 where the tire side wall contacts the drill fixture 212 at one or more radial slots in the drill fixture 212. The vent hole(s) can be as small as ⅛ of an inch in diameter and as large as 1/16 of an inch in diameter. More holes and larger diameter holes are recommended for larger tires in order to inject the liquid reactants into the tire and wheel assembly 208 and to allow them to react within the tire to form the foam filled tire disclosed herein. Further, with more vent holes in the tire, the reactant mixture can be injected and distributed in the tire and wheel assembly 208 more evenly and with fewer air pockets. The diameter of the vent holes should be such that the foam leaks only a minimal amount out of the vent holes and does not blow out of the vent holes. When the foam cures within the tire, the foam forms a skin layer around the tire and over the vent holes and, thus, very little foam escapes from the vent holes.

Also referring to FIG. 2, the stem valve is removed leaving opening 206, into which the static mixer 116 is inserted. The drill fixture 212 may have an opening for the static mixer 116 to be disposed through the stem valve opening. The pumps 106A–B supply the reactant materials in containers 108A–B to the static mixer 116. As the static mixer 116 mixes the reactant materials, the nucleating material compressor (not shown) supplies nucleating gas to the nucleating material supply line 118. The nucleating gas travels through the orifice 204 into nucleating material inlet 202 of the static mixer 116 where it is entrained into the mixed reactant materials. The nucleating gas can be controlled by a flow valve or an assortment of various sized restrictor orifices 204. A nucleating gas compressor can be provided on the cart assembly or located remotely from the cart assembly. The mixture is injected into the tire and wheel assembly 208 until it replaces the air in the tire and wheel assembly 208. A plug is then inserted into the valve stem opening 206 to provide a seal retaining the mixture within the tire and wheel assembly 208.

Figure 4A:
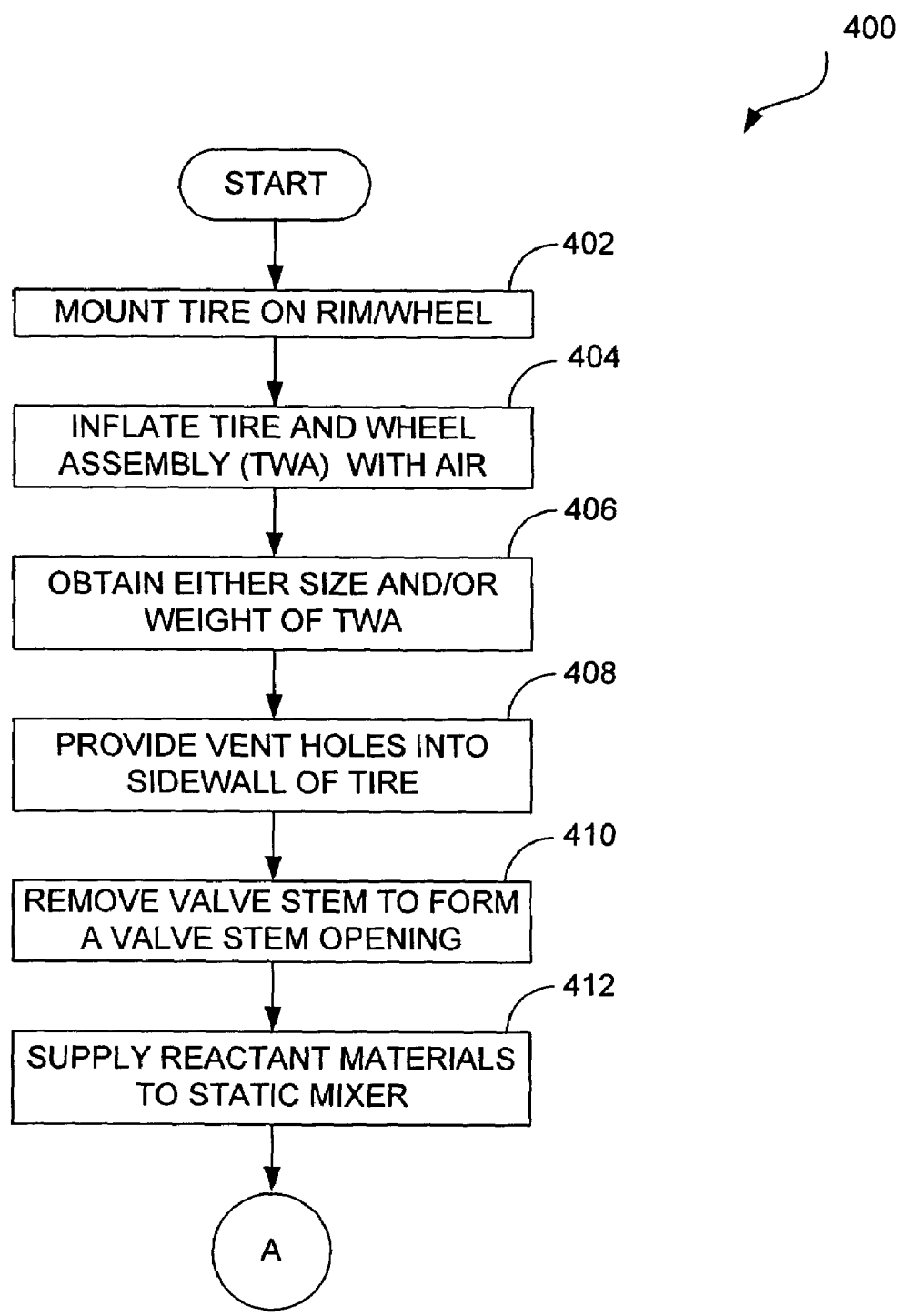
FIGS. 4A and B are a flow diagram that illustrates an embodiment of the process for flatproofing a tire and wheel assembly carried out by the apparatus of FIGS. 1–3.
Figure 4B:
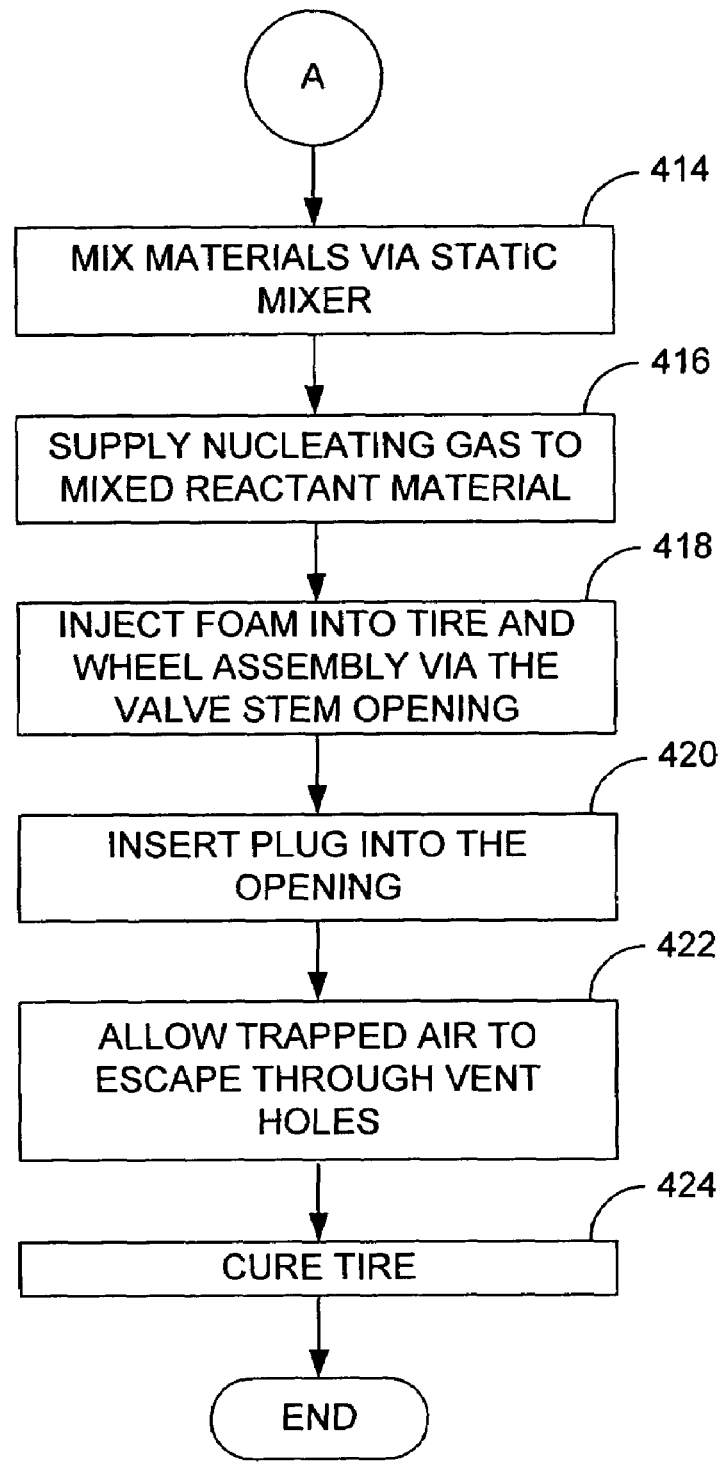

FIGS. 4A–B illustrate an exemplary embodiment of the present method for flatproofing a tire and wheel assembly. Referring to FIG. 4A, the method 400 for flatproofing a tire and wheel assembly 210 comprises mounting the tubeless tire 210 on the rim/wheel to form a tire and wheel assembly 208, as shown in block 402. The tire and wheel assembly 208 is preferably filled with air to its maximum recommended rated air pressure to stretch the tire carcass, as shown in block 404. In an exemplary embodiment, the air-filled tire and wheel assembly 208 is mounted and stretched for approximately twelve (12) hours, assuring that the beads of the tire are properly seated on the wheel, making for an air-tight chamber, and the tire 210 is stretched to its proper size and shape. When the mixture of liquid reactants and entrained gas is injected into the tubeless tire and wheel assembly 208, the mixture fills the tire 210 and does not need to stretch the tire 210. Thus, the mixture does not need to be injected into the tire under pressure and, in particular, can be injected at a pressure below the normal air inflation pressure of the tire.

In block 406, the size of the tire and wheel assembly 208 is obtained so that the amount of the mixture to be injected into the tire and wheel assembly 208 can be determined. The worktable 114 may include a built-in weight scale 120 to weigh the tire and wheel assembly 208. The tire and wheel assembly 208 may be placed on its side on the weight scale 120 to obtain the size and/or weight of the tire and wheel assembly 208. Inclusion and use of such a weight scale is optional.

In block 408, at least one vent hole is drilled to provide an outlet for the air within the tire carcass to escape as the tire 210 is filled with the reactant material. The vent hole(s) can be located on the side wall of the tire 210 where the tire side wall contacts the drill fixture 212 at one or more radial slots in the drill fixture 212. In block 410, the valve stem is removed from the tire and wheel assembly 208 to form a valve stem opening 206 such that the static mixer 116 is disposed therein. The static mixer 116 is placed into the valve stem opening 206 to inject foam through the valve stem opening 206 into the tire. In block 412, the pumps 108A–B are activated to supply the polyurethane reactant materials to the static mixer 116.

Referring to FIG. 4B, in block 414, the static mixer 116 mixes the reactant materials along the nucleating gas inlet 202. In block 416, the nucleating compressor supplies nucleating gas to the mixed material in the static mixer to form a mixture of the liquid reactants with entrained gas. In an exemplary embodiment, the nucleating gas can be injected at the nucleating material inlet point (L2), which may be 5 to 8 helical elements 302 from the mixer head 104 end of the static mixer 116 towards its outlet 304.

In block 418, the mixture of the liquid reactants with entrained nucleating gas is injected into the tire and wheel assembly 208 via the valve stem opening 206. In an exemplary embodiment, the reactant materials are mixed and injected into the tire under ambient temperature and pressure conditions. By ambient temperature, is meant, in the range of about 70° F. to about 80° F. At the lower end of this temperature range, it is preferred that the temperature be high enough to avoid freezing of the polyisocyanate which can cause the polyisocyanate to become unstable.

Once the tire and wheel assembly 208 is filled with the mixture, the apparatus shuts down and the static mixer 116 is removed from the valve stem opening 206. The dispensing apparatus 100 can automatically input the amount of mixture necessary to fill the tire and wheel assembly 208 based on the size and/or weight of the tire and wheel assembly 208 obtained as described in block 406. In an exemplary embodiment, the tire can be filled in about 30 seconds or less. The apparatus 100 can also have a safety feature for automatically filling the tire and shutting down the apparatus 100 when the desired amount of mixture is injected into the tire and wheel assembly to prevent from over filling the tire with the mixture. For example, the apparatus 100 may include a trigger that activates injecting the mixture into the tire and wheel assembly 208. If the trigger is accidentally released prior to the apparatus 100 completing the injection of the mixture, the apparatus will automatically shut down as a safety precaution.

The automatic filling feature can be carried out by a control panel (not shown) mounted on the cart assembly 110 including a key pad allowing the operator to enter the number of pounds of fill desired for a given tire size. The key pad can also be used to input the specific gravity for the fill mixture to be injected into the tire. The control panel can include a processor programmed to convert the weight number input to a volume to determine the desired flow rate (pump rate) required to inject the selected weight of fill into the tire. Pump speed for the reactant materials can be monitored and controlled by, for example, placing a counter on the drive shaft of each pump to monitor the number of rotations of the shaft and thereby monitor the volume of the reactant materials. The weight scale 120 on work surface 114 can be used to weigh the empty tire and wheel assembly to obtain a tare weight for the tire and wheel assembly and to monitor weight increase for the tire and wheel assembly as the mixture of reactant materials with entrained gas is injected into the tire. Once the weight selected by the operator is reached, the control panel can be programmed to shut off the pumps for the reactant materials and also the source of nucleating gas to the mixer.

In block 420, after filling, the valve stem opening 206 can be plugged with a rubber plug to keep the mixture inside the tire and wheel assembly 208. The inserted plug can also serve to prevent a user from accidentally adding air to the foam-filled tire and wheel assembly 208. The plug may be an indication that the tire and wheel assembly 208 has been filled with foam. The filled tire and wheel assembly 208 is placed on its side for about 3–10 minutes to allow the mixture to react to create the foam and to allow the foam to rise and to allow trapped air to escape from the vent holes(s) formed in the tire, as shown in block 422. This also allows the foam to take an initial cure. If the filled tire is handled before the initial foam cure takes, the tire bead may be dislodged from the wheel. The foam-filled tire and wheel assembly 208 can then be placed on a holding fixture, such as a storage rack, and set aside for about 12–24 hours (cure time), as shown in block 424. After 12–24 hours, the foam-filled tire 208 can be returned to service. The resulting tire and wheel assembly is now filled with a flexible, light weight foam having a cellular structure with a density of about 30 lbs/ft$^3$ or less. In one, but not the only, exemplary embodiment the resulting foam has a density of 14.5 lbs/ft$^3$ or less.

It should be emphasized that the above-described embodiments of the present method for flatproofing a tire and wheel assembly, and the resulting flatproofed assembly, particularly, any "preferred" embodiments, are merely possible examples of implementations, merely set forth for a clear understanding of the principles of the invention. Many variations and modifications may be made to the above-described embodiment(s) without departing substantially from the spirit and principles of the invention. All such modifications and variations are intended to be included herein within the scope of this disclosure and protected by the following claims.

Therefore, having thus described the invention, at least the following is claimed:

1. A method for flatproofing a tire and wheel assembly comprising the steps of:
   supplying to a static mixer at least two materials which react together to create a foam;
   mixing the reactant materials with the static mixer;
   supplying nucleating gas to the static mixer at a pressure sufficient to entrain the gas in the mixture of reactant materials in the static mixer;
   injecting the mixture of reactant materials with entrained gas into said tire and wheel assembly;
   allowing the mixture of reactant materials to react within the tire and wheel assembly to create a foam-fill within the tire and wheel assembly; and
   curing the foam-fill within the tire and wheel assembly.

2. The method as defined in claim 1, wherein the reactant materials include a polyisocyanate and a polyol for reacting together to form a polyurethane foam.

3. The method as defined in claim 1, further comprising removing a valve stem from the tire and wheel assembly to form a valve stem opening.

4. The method as defined in claim 3, wherein injecting the mixture of reactant materials with entrained gas into the tire and wheel assembly comprises injecting the mixture through the valve stem opening.

5. The method as defined in claim 4, further comprising inserting a plug into the valve stem opening after injection is complete.

6. The method as defined in claim 1, further comprising mounting a tire on a rim and wheel to form said tire and wheel assembly.

7. The method as defined in claim 1, further comprising filling said tire and wheel assembly with air prior to injecting the mixture to stretch the tire.

8. The method as defined in claim 1, further comprising obtaining the size of the tire and wheel assembly to determine the amount of the mixture to be injected into said tire and wheel assembly.

9. The method as defined in claim 1, further comprising forming at least one vent hole in said tire prior to injecting the mixture.

10. The method as defined in claim 9, further comprising allowing the foam to rise in said tire and wheel assembly and allowing trapped air to escape through the vent hole in said tire.

11. The method as defined in claim 1, wherein injecting the mixture into said tire and wheel assembly comprises automatically injecting the amount of the mixture necessary to fill said tire and wheel assembly based on the size and/or weight of the tire and wheel assembly obtained.

12. The method as defined in claim 1, wherein the reactant materials are mixed and injected into the tire under ambient temperature conditions.

13. The method as defined in claim 1, wherein the reactant materials are mixed and injected into the tire under ambient pressure conditions.

14. The method as defined in claim 1, wherein injecting the mixture of reactant materials with entrained gas into the tire and wheel assembly comprises injecting the mixture through the valve stem.

15. The method as defined in claim 1, further comprising drilling a hole through the tire sidewall or wheel to form a valve stem opening.

16. The method as defined in claim 15, wherein injecting the mixture of reactant materials with entrained gas into the tire and wheel assembly comprises injecting the mixture through the hole created in the tire sidewall or wheel rim.

17. The method as defined in claim 1, wherein the tire and wheel assembly to be flatproofed is a tubed tire and wheel assembly.

18. The method as defined in claim 1, further comprising first weighing the tire and wheel assembly to determine the amount of the mixture of reactant materials to inject into the tire and wheel assembly.

19. The method as defined in claim 1, further comprising filing the tire and wheel assembly with a mixture of reactant materials to create a foam having a cellular structure of low density of about 30 lbs/ft$^3$ or less.

20. The method as defined in claim 1, further comprising filing the tire and wheel assembly with a mixture of reactant materials to create a foam having a cellular structure of low density of about 14.5 lbs/ft$^3$ or less.

21. A method for flatproofing a tire and wheel assembly comprising the steps of:

supplying to a static mixer at least two materials which react together to create a foam;

mixing the reactant materials with the static mixer;

supplying nucleating gas to the static mixer at a pressure sufficient to entrain the gas in the mixture of reactant materials in the static mixer:

weighing the tire and wheel assembly to determine the amount of the mixture of reactant materials to inject into the tire and wheel assembly;

filling said tire and wheel assembly with air to stretch the tire prior to injecting the mixture;

forming at least one vent hole in said tire prior to injecting the mixture;

injecting the mixture of reactant materials with entrained gas into said tire and wheel assembly;

allowing the foam to rise in said tire and wheel assembly and allowing trapped air to escape through the vent hole in said tire;

allowing the mixture of reactant materials to react within the tire and wheel assembly to create a foam-fill within the tire; and curing the foam-fill within the tire and wheel assembly.

* * * * *